US008583345B2

(12) United States Patent  
Krauter et al.

(10) Patent No.: US 8,583,345 B2  
(45) Date of Patent: Nov. 12, 2013

(54) CONTROL CHIP FOR PROVIDING THE BASIC FUNCTIONALITY OF A CONTROL UNIT

(75) Inventors: Immanuel Krauter, Burgstetten (DE); Uwe Guenther, Nufringen (DE); Manfred Kirschner, Stuttgart (DE); Beate Leibbrand, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 1008 days.

(21) Appl. No.: 11/990,146

(22) PCT Filed: Aug. 4, 2006

(86) PCT No.: PCT/EP2006/065087  
§ 371 (c)(1),  
(2), (4) Date: Sep. 27, 2010

(87) PCT Pub. No.: WO2007/017477  
PCT Pub. Date: Feb. 15, 2007

(65) Prior Publication Data  
US 2011/0022287 A1    Jan. 27, 2011

(30) Foreign Application Priority Data  
Aug. 8, 2005   (DE) .......................... 10 2005 037 264

(51) Int. Cl.  
*F02D 41/30*    (2006.01)  
*G06F 19/00*    (2011.01)  
*H02B 1/26*     (2006.01)

(52) U.S. Cl.  
USPC ............ 701/103; 701/102; 361/622; 307/112

(58) Field of Classification Search  
USPC .......... 701/102, 103, 114, 115; 710/100, 305; 361/139, 160, 170, 622; 307/38, 39, 307/112  
See application file for complete search history.

(56) References Cited

U.S. PATENT DOCUMENTS 5,684,338 A * 11/1997 Linton et al. ................. 307/10.2  
2004/0249551 A1 * 12/2004 Graf et al. ..................... 701/102

FOREIGN PATENT DOCUMENTS

| DE | 103 34 014 | 9/2004 |
| EP | 1 152 250 | 11/2001 |
| EP | 1 342 909 | 9/2003 |
| JP | 64-58042 | 6/1989 |
| JP | 2001313368 | 11/2001 |
| JP | 200399417 | 4/2003 |
| JP | 2004286029 | 10/2004 |

OTHER PUBLICATIONS

International Search Report, PCT International Patent Application No. PCT/EP2006/065087, dated Oct. 18, 2006.

* cited by examiner

*Primary Examiner* — Willis R Wolfe, Jr.  
*Assistant Examiner* — Johnny Hoang  
(74) *Attorney, Agent, or Firm* — Kenyon & Kenyon LLP

(57) ABSTRACT

A control chip for providing the basic functionality of a control unit includes a voltage supply having at least two, in particular three, output voltages; at least two, in particular three, sensor power supplies, in particular having 5-V and/or 3.3-V output voltage; at least one driver for bidirectional interfaces; a CAN driver; a follower control; a main relay output stage having a diagnostic function; at least one bidirectional serial interface for controlling the output stages and for communicating with a microcontroller; at least six power output stages, in particular having rated currents of 0.6 A to 3 A; at least one low-level signal output, in particular having a rated current of 50 mA, and four ignition drivers.

19 Claims, 1 Drawing Sheet

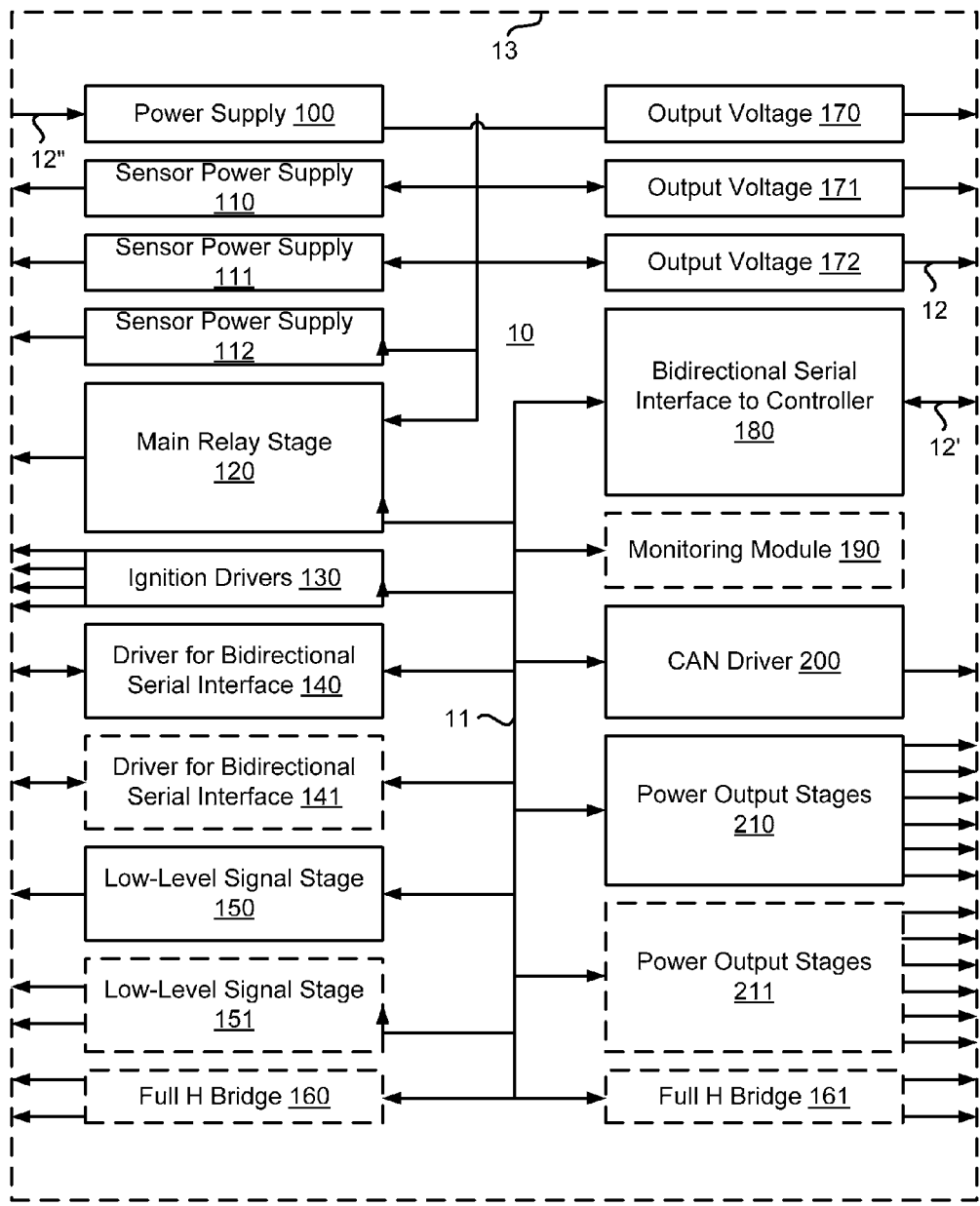

CONTROL CHIP FOR PROVIDING THE BASIC FUNCTIONALITY OF A CONTROL UNIT

FIELD OF THE INVENTION

The present invention relates to a control (peripheral/terminal) chip for providing the basic functionality of a control unit, also referred to below simply as a U chip.

BACKGROUND INFORMATION

Modern control units, in particular for engine control, include a computer core (microcontroller) and a peripheral chip set for implementation of the required hardware functions. This peripheral chip set typically includes various application-specific integrated circuits (ASICs) and other electronic modules. Distribution of the required hardware functions among the various ASICs and modules is referred to as partitioning.

A peripheral chip set of the engine control unit generation according to the related art typically has partitioning that includes two ASICs.

A first ASIC (ASIC 1) is provided here and has the following components: a power supply (on-off controller, which may also be configured as a linear controller) having four different output voltages; three 5-V sensor power supplies, two of which may also be configured for 3.3-V output voltage independently of one another, the sensor power supplies being diagnosable for short-circuit to ground and short-circuit to battery voltage; a monitoring module; a driver for bidirectional interfaces; a CAN driver having a wake-up functionality; a follower control; a main relay output stage featuring a diagnostic function for fault cases, i.e., short-circuit to battery voltage, short-circuit to ground, a drop in load and overheating; a stop counter and a bidirectional serial interface (SPI) for communication with the microcontroller.

A second ASIC (ASIC 2) has the following components: power output stages having a nominal current from 1.1 A to 3 A; a diagnostic function for fault cases, i.e., short-circuit to battery voltage, short-circuit to ground, a drop in load and overheating; 5-V supply voltage monitoring; a bidirectional serial interface for communication with the microcontroller and a unidirectional serial interface (µs bus) for controlling the output stages.

German Published Patent Application No. 10 34 014 describes a peripheral chip set in which the basic functionality of a control unit is partitioned between two ASICs as described above. Depending on the requirements of the hardware functions, additional modules may be necessary.

However, the hardware functions indicated above are only partially required for production of engine control units of the basic segment (control unit segment having the most essential functions). This means that today's peripheral chip sets are "oversized" from the standpoint of the required (circuit board) area as well as cost factors.

SUMMARY

Example embodiments of the present invention provide partitioning that combines the elementary hardware functions of a control unit in the smallest possible area and is simple and inexpensive to implement.

Example embodiments of the present invention provide a control chip including a power supply having at least two, in particular three, output voltages; at least two, in particular three, sensor power supplies, in particular a 5-V and/or 3.3-V output voltage; at least one driver for bidirectional interfaces; a CAN driver; a follower control; a main relay output stage having a diagnostic function; at least one bidirectional serial interface for controlling the output stages and for communicating with a microcontroller; at least six power output stages, in particular having a nominal current of 0.6 A to 3 A; at least one low signal output, in particular having a rated current of 50 mA and four ignition drivers.

Such a highly integrated U chip takes into account the requirements with regard to cost optimization and optimization of the area required on the circuit board.

An aspect of example embodiments of the present invention is that the advantages of high integration are utilized for implementation of innovative partitioning for control units of the basic segment. In this manner, the hardware functions represented by ASICs 1 and 2 and, if necessary, also by expansion ICs may be reduced to the elementary functions, e.g., those that are to be implemented in an engine control unit of the basic segment, thus yielding a cost savings. At the same time, redundant ASIC circuit parts such as a voltage supply and SPI (single-point injection) on ASIC 1 and 2 are eliminated by combining them with expansion ICs on a U chip, which results in further cost savings. Furthermore, ASIC packages of at least two are reduced to one, thus eliminating additional costs. The area required on the circuit board is reduced, resulting in an increased benefit and additional cost advantage. Moreover, the µs bus may consequently be utilized to reduce the number of lines and component pins.

The diagnostic function may be designed for detecting fault cases, in particular for short-circuit to battery voltage, short-circuit to ground, a drop in load or overheating. The results may thus be analyzed by off-board diagnostic (OBD) test equipment, which facilitates location of a fault during maintenance.

To prevent damage to the control unit due to faults, an additional module may be provided for monitoring it. The control unit then tests itself by writing a memory with test samples, for example, and reading them again; a comparison with checksums ensures that data and programs are stored correctly.

With an additional driver for serial interfaces, it is possible to connect devices that require such drivers. For example, the test device mentioned above may be used; it normally requires a serial communications interface (ISO 9141) having a free baud rate of 10 to 10 kbaud.

To implement additional functions of a control unit, six additional power output stages may be integrated into the U chip, in particular with rated currents of 0.6 A to 3 A. In addition to the basic functions, e.g., those of an engine control unit, such as setting the operating state desired by the driver, the transmission and air conditioning system, for example, may also be controlled in this manner.

Two additional low-level signal stages, in particular with rated currents of 50 mA, may be provided as additional circuit components. Additional small devices having a low control voltage, e.g., relays, displays, etc., may also be triggered in this way.

In an example embodiment, two full H bridges may also be provided, allowing control of devices having a high control voltage with low space requirement of the bridges at the same time. These may optionally be configurable as single high-side and low high-side switches to ensure high adaptability to the particular use conditions.

This adaptability is increased by the fact that the sensor power supply is configurable from 3.3 V to 5 V.

According to example embodiments of the present invention, the U chip is suitable for a control unit, in particular for an engine control unit of a future generation, in particular for gasoline and diesel engines. The engine control unit may be designed as a control unit for an engine management system, in particular a fuel injection system. The peripheral chip set is designed by the modular principle using integrated application-specific elementary circuits to provide a basic functionality of the control unit and optionally with application-specific integrated expansion circuits to provide requirements that go beyond the basic functionality of the control unit. An individual size adjustment to concrete functionalities of a control unit is implementable on the basis of the flexible and modular design of the peripheral chip set, which is designed to meet these requirements.

Example embodiments of the present invention are explained in greater detail below. The same or similar parts are labeled with the same reference numeral.

BRIEF DESCRIPTION OF THE DRAWING

The FIGURE illustrates partitioning of a U chip.

DETAILED DESCRIPTION

The single FIGURE shows a diagram of concrete partitioning of a U chip 10 for an engine control unit according to an exemplary embodiment of the present invention. Chip 10 has a power supply 100, sensor power supplies 110, 111, and 112, a main relay stage 120 having a diagnostic function and follower control, ignition drivers 130, a driver for one bidirectional interface, 140, a low-level signal stage 150 of about 50 mA, output voltages 170, 171, and 172, a bidirectional serial interface to the controller 180, a CAN driver 200 and power output stages 210 of about 0.6 A to 3 A as the basic segment. Another driver for a bidirectional interface 141, low-level signal stages 151 of 50 mA, full H bridges 160 and 161, one additional monitoring module 190 and additional power output stages 211 of about 0.6 A to 3 A, each shown with dotted lines, are optionally also provided in the example embodiment shown.

The components except for the power supply 100, sensor power supplies 100 to 112, and the output voltages 170 to 172 communicate among themselves via a serial connection 11. Input and/or output terminals 12, 12', 12" of the components are represented by corresponding arrows to edge 13 thereof. Depending on the demands made of the functionality of a control unit, chip 10 may be designed according to the FIGURE. Owing to the possibility of designing chip 10 to be modular and flexible, hardware functions of the control unit may be supplemented individually beyond the basic segment. Optional components of chip 10 as illustrated in the FIGURE may be replaced by other components in accordance with the particular demands.

With the example embodiment according to the present invention, the partitioning of the peripheral chip set is adapted to future requirements. An additional advantage of the partitioning is its high flexibility in particular. The basic functionality of a control unit may thus be displayed with one electronic unit, i.e., ASIC. This permits inexpensive coverage of the low-price segment. In particular, individual basic functionalities may be provided with one electronic unit and/or ASIC on a modular basis. It is therefore not necessary for ASICs having a complex structure to be used for these basic functionalities.

What is claimed is:

1. A control chip for providing basic functionality of a control unit, comprising
a voltage supply having at least two output voltages;
at least two sensor power supplies;
at least one driver for bidirectional interfaces;
a CAN driver;
a follower control;
a main relay output stage having a diagnostic function;
at least one bidirectional serial interface configured to control the output stages and to communicate with a microcontroller;
at least six power output stages;
at least one low-level signal output stage; and
four ignition drivers.

2. The control chip according to claim 1, wherein the voltage supply includes three output voltages.

3. The control chip according to claim 1, wherein the control chip includes three sensor power supplies.

4. The control chip according to claim 1, wherein the sensor power supplies have an output voltage of at least one of (a) 5 V and (b) 3.3 V.

5. The control chip according to claim 1, wherein the power output stage has a rated current of 0.6 A to 3 A.

6. The control chip according to claim 1, wherein the low-level signal output stage has a rated current of 50 mA.

7. The control chip according to claim 1, wherein a diagnostic function is adapted to detect at least one of (a) a fault case, (b) a short-circuit to battery voltage, (c) a short-circuit to ground, (d) a drop in load and (e) overheating.

8. The control chip according to claim 1, further comprising an additional module configured to monitor the control unit.

9. The control chip according to claim 1, further comprising an additional driver for serial interfaces.

10. The control chip according to claim 1, further comprising six additional power output stages.

11. The control chip according to claim 1, further comprising six additional power output stages having rated currents of 0.6 A to 3 A.

12. The control chip according to claim 1, further comprising two additional low-level signal stages.

13. The control chip according to claim 1, further comprising two additional low-level signal stages having rated currents of 50 mA.

14. The control chip according to claim 1, further comprising two full H bridges.

15. The control chip according to claim 14, wherein the full H bridges are selectively configurable as single high-side switches and low high-side switches.

16. The control chip according to claim 1, wherein the sensor power supply is configurable from 3.3 V to 5 V.

17. An engine control unit, comprising:
a control chip configured to provide basic functionality of a control unit including:
a voltage supply having at least two output voltages;
at least two sensor power supplies;
at least one driver for bidirectional interfaces;
a CAN driver;
a follower control;
a main relay output stage having a diagnostic function;
at least one bidirectional serial interface configured to control the output stages and to communicate with a microcontroller;
at least six power output stages;
at least one low-level signal output stage; and
four ignition drivers.

18. The engine control unit according to claim 17, wherein the engine control unit is configured as an engine control unit for a motor vehicle.

19. The engine control unit according to claim 17, wherein the control unit is configured as a control unit for at least one of (a) an engine management system and (b) a fuel injection system.

* * * * *

UNITED STATES PATENT AND TRADEMARK OFFICE
CERTIFICATE OF CORRECTION

PATENT NO. : 8,583,345 B2  Page 1 of 1
APPLICATION NO. : 11/990146
DATED : November 12, 2013
INVENTOR(S) : Krauter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1680 days.

Signed and Sealed this
Twenty-second Day of September, 2015

Michelle K. Lee
*Director of the United States Patent and Trademark Office*